United States Patent [19]

Harris

[11] Patent Number: 4,813,509

[45] Date of Patent: Mar. 21, 1989

[54] MECHANICAL ENERGY STORAGE AND USE SYSTEM FOR MOTOR VEHICLES

[76] Inventor: Richard J. Harris, 16277 Hanover Pike, Hampstead, Md. 21074

[21] Appl. No.: 119,955

[22] Filed: Nov. 13, 1987

[51] Int. Cl.[4] ............................................. B60K 9/00
[52] U.S. Cl. ................................. 180/165; 180/54.2; 60/414; 185/41 WW; 185/41 R
[58] Field of Search ..................... 180/54.2, 165, 280; 280/215; 60/414; 185/40 R, 40 H, 41 A, 43, 41 WW, 41 R, 39

[56] References Cited

U.S. PATENT DOCUMENTS

| | | | |
|---|---|---|---|
| 1,112,595 | 10/1914 | Brown | 180/165 |
| 2,137,574 | 11/1938 | Kromer | 180/165 |
| 2,240,011 | 4/1941 | Casey | 60/418 |
| 3,734,535 | 5/1973 | Sidlauskas | 280/215 |
| 4,240,515 | 12/1980 | Kirkwood | 180/165 |
| 4,319,655 | 3/1982 | Hoppie | 180/165 |
| 4,473,753 | 9/1984 | Izumi et al. | 180/165 X |
| 4,479,356 | 10/1984 | Gill | 180/165 |
| 4,597,463 | 7/1986 | Barnard | 180/165 |
| 4,615,180 | 10/1986 | Rudman | 180/282 |

FOREIGN PATENT DOCUMENTS 1963115  6/1971  Fed. Rep. of Germany ...... 180/282

Primary Examiner—David M. Mitchell
Assistant Examiner—Brian L. Johnson
Attorney, Agent, or Firm—Leonard Bloom

[57] ABSTRACT

A system for wheeled land vehicles stores energy in a spring when the vehicle is braking, as when stopping or going downhill, and releases energy stored to help the vehicle engine when starting or when going uphill. A mercury switch can serve as an inclinometer in a simple version of the invention. The mercury switch when tipped in downhill direction, actuates a clutch system that, for braking, connects a first end of a coil spring to the engine driveshaft and a second end of the coil spring to the frame of the vehicle, for winding up the coil spring in braking and for steering braking energy in the coil spring. When the mercury switch is tipped in uphill direction, it actuates the clutch system so that it disconnects the first end of the coil spring from the engine driveshaft and connects it to the frame of the vehicle, and disconnects the second end of the coil spring from the frame of the vehicle and connects it to the engine driveshaft, helping power the vehicle. Neutral, and manual override, provisions permit a vehicle driver to change operation of the system when desired or to disable operation of the system.

3 Claims, 1 Drawing Sheet

4,813,509

MECHANICAL ENERGY STORAGE AND USE SYSTEM FOR MOTOR VEHICLES

FIELD OF THE INVENTION

This invention relates generally to land vehicles and specifically to devices which provide for the recovery of mechanical energy when a vehicle is coasting downhill and releasing this energy back into the drivetrain when the vehicle is moving on a flat or uphill surface.

BACKGROUND OF THE INVENTION

U.S. Pat. No. 2,240,011 issued to H. W. Casey on Apr. 29, 1941 shows a Diesel type engine as the power plant with energy storage by pumping fluid into a chamber system that has compressible springs to store the energy for use at times of peak demand by running the fluid through a fluid motor;

U.S. Pat. No. 4,240,515 issued to Robert W. Kirkwood on Dec. 23, 1980, shows a hydraulic drive system for a motor vehicle that pumps fluid into a fluid accumulator for use on demand and also recovers kinetic energy from the system when the vehicle is decelerating, all of which may be regulated by a speed control analogous to an automatic cruise control;

U.S. Pat. No. 4,319,655 issued to L. O. Hoppie on Mar. 16, 1982, shows a regenerative braking system that employs rubber rollers that on demand, as in braking a vehicle, are twisted to store energy in them and that release the energy when relatively relaxed by varying a drive ratio;

U. S. Pat. No. 4,473,753 issued to H. Izumi, et al on Sept. 25, 1984, shows a vehicular energy storage braking system employing a fly wheel; and U.S. Pat. No. 4,597,463 issued to R. Barnard on July 1, 1986, shows an electric and internal combustion vehicle system that uses kinetic energy storage in springs or rubberbands.

SUMMARY OF THE INVENTION

The following is described in accordance with objects of the invention.

The accomplishment of the concept of this invention employs a mechanical spring which will begin winding as a vehicle begins its downhill motion, both braking the vehicle and storing energy. While the vehicle is moving downhill, the spring will continue to wind until tight. When the vehicle begins to travel uphill, a gravity-oriented switch causes the spring to release the accumulated energy and assist the engine of the vehicle, thereby reducing the need for fuel. Spring-stored energy can also be directed on startup to start and to assist the engine.

The invention will be connected to the vehicle in two ways. The first is the direct link with the engine or drivetrain through a gear or belt. This is the direct storage or release of energy to the vehicle. The second connection is to a secondary device which would tell the spring device whether to store, retain, or release energy. This will, in simplest mode as indicated, employ an inclinometer. Cruise control techniques can also be employed.

The effectiveness of this invention will be subject to effective size and tensile strength of the spring. It will also be dependent on the type of drive used to transmit the energy (direct gear or rubber belt being possibilities).

In summary, this invention permits a vehicle to use downhill gravity force to help impel it when it is traveling uphill or starting to move so that it would use less energy and need less fuel.

Said another way, there is provided a system for wheeled land vehicles that stores energy in a spring when the vehicle is braking, as when stopping or going downhill, and releases energy stored to help the vehicle engine when starting or when going uphill. A mercury switch can serve as an inclinometer in a simple version of the invention.

The mercury switch when tipped in downhill direction, actuates a clutch system that, for braking, connects a first end of a coil spring to the engine driveshaft and a second end of the coil spring to the frame of the vehicle, for winding up the coil spring in braking and for storing braking energy in the coil spring. When the mercury switch is tipped in uphill direction, it actuates the clutch system so that it disconnects the first end of the coil spring from the engine driveshaft and connects it to the frame of the vehicle, and disconnects the second end of the coil spring from the frame of the vehicle and connects it to the engine driveshaft, helping power the vehicle. Neutral, and manual override provisions permit a vehicle driver to change operation of the system where desired or to disable operation of the system.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
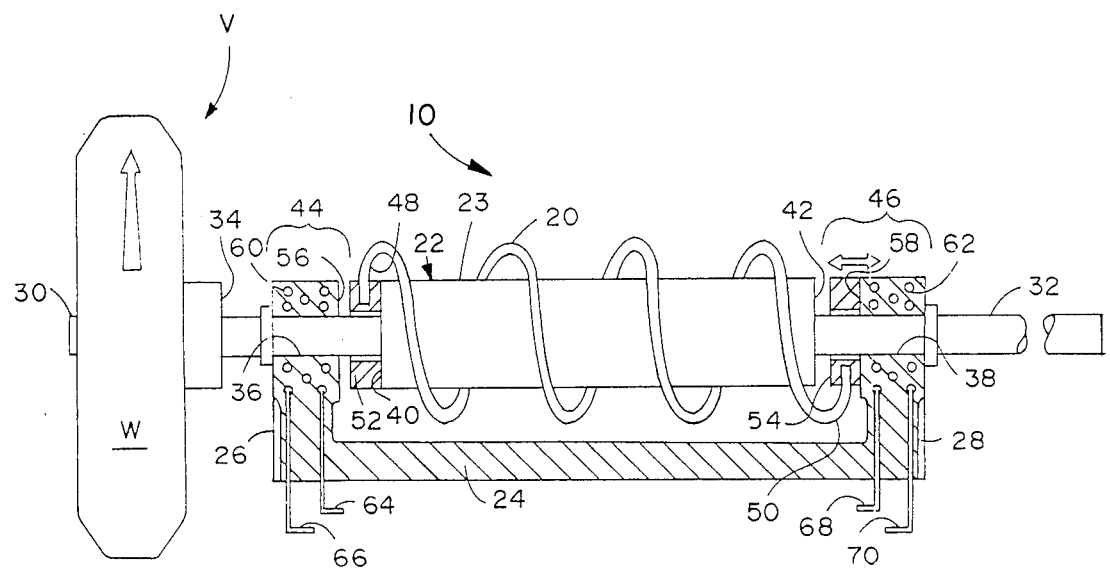
FIG. 1 is a diagrammatical partly-sectional elevational view illustrating aspects of a preferred embodiment of the invention.

FIG. 1 diagrams a representative embodiment 10 showing the principle of the invention. Any suitable conventional land vehicle V with conventional propulsion (not shown) may be used.

The vehicle may have any suitable number of ground contacting drive wheels, one, W, is shown for simplicity of exposition. Through this, as will be seen, spring 20 on shaft 22 may wind up and store energy for later release also through the wheel, when needed. The spring shown is for exposition, in practice a heavier spring of many more turns would be used.

The vehicle may have any suitable, preferably conventional, frame. Shown is frame 24, generally "U"-shaped, with the arms 26, 28 of the "U"-shape supporting respective first and second smaller-diameter, coaxial ends 30, 32 of shaft 22. The wheel may be rotatably connectable either directly or, for example, through a conventional mechanical or electromechanical clutch 34 with the shaft. The shaft rotates freely in coaxial holes 36, 38 in the frame, at all times.

At each end of the larger-diameter central part 23 of the shaft may be a radial face 40, 42, arranged to be part of a respective electric clutch of which there may be one, 44, 46 at each end.

These clutches provide for attachment of the spring ends to the frame and shaft selectively: first end to frame and second end to shaft, and vice versa, to select mode of energy transfer.

For this, the ends 48, 50 of the spring 20 may be held by welding or other suitable affixation to respective slider rings 52, 54 of magnetic material such as mild steel. The slider rings or sliders 52, 54 as solenoid armatures, free to travel axially against the shaft face 40, 42 and the "U"-shape arm face 56, 58 when the solenoid system is actuated. The shaft may be of non-magnetic stainless steel.

The "U"-shape arms 26, 28 are preferably non-magnetic. They may be of brass and cast in halves for conventional installation of the solenoid windings 60, 62 and electric leads 64, 66, 68, 70.

OPERATION

Without actuation the two armatures or sliders 52, 54 float freely. Solenoid actuation of the two sliders 52, 54 is always with both moved in the same direction; either both sliders slide to the right, the position shown in the drawing figure, or both slide to the left. With both sliders to the right, as shown, the spring winds up and stores energy. For this, solenoid action detachably affixes the slider 54 to the frame arm face 58 and the slider 52 to the shaft at face 40, as viewed from the left end.

Said another way, rotation of shaft 22 by the wheel W in counterclockwise direction (arrow) as when using the system for braking or retardation winds the spring. Conventional adjustment of clutch slippage at 34 or at the sliders 52, 54 can be used to prevent overwinding.

For diagrammatical purposes, explaining how the elements relate, the driveshaft has at each end a solenoid armature 52 and 54. On signal, one of these, 54 shown, holds to the driveshaft, the opposite end of the spring being similarly held to the frame by the other armature, 52 shown.

To release the stored energy into the vehicle-drive and to urge the vehicle forward as in starting or ascending a hill, the ends 48 and 50 of the coil spring are together oppositely connected from the position shown; the first end 48 through (slider) armature 52 to the frame face 56 and the second end 50 through (slider) armature 54 to the shaft face 42.

Figure 2:
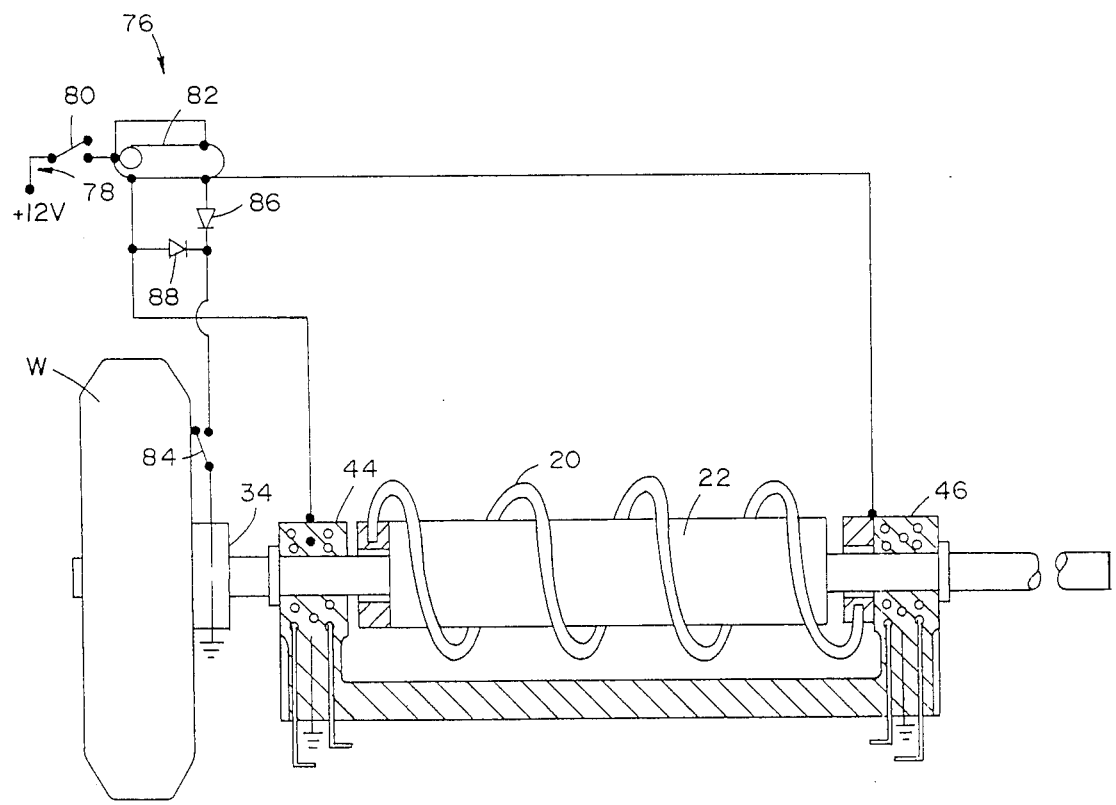
FIG. 2 is a schematic drawing of an electrical system used for simplicity in the preferred embodiment.

FIG. 2 diagrams a conventional electrical circuit 76, one of many such that could be used to control and actuate the system. A conventional source of current appears at 78 and may have an on-off switch 80.

An attitude sensitive switch 82 that may be a mercury switch is fixed to the vehicle frame (or to the vehicle engine housing) and responds, depending on vehicle inclination with respect to gravity, to actuate the armatures of the electrical clutches 44, 46 to the right, or to the left, causing the spring 20 to wind, or to yield energy (when wound) as above described in FIG. 1, in relation to the shaft 22 and wheel W.

Wheel clutch 34 may have a means of actuation in the form of a switch 84 to control the circuit to it.

The diodes 86, 88 prevent backfeed through clutch engagement.

It will be appreciated that the circuitry need not involve generators or electric motors, but applies power directly to the drive, mechanically.

This invention is not to be construed as limited to the particular forms disclosed herein, since these are to be regarded as illustrative rather than restrictive. It is, therefore, to be understood that the invention may be practiced within the scope of the claims otherwise than as specifically described.

For example, for "frame", the meaning may be alternatively the housing of the driveshaft or of the crankshaft of an engine on the vehicle or of a flywheel housing.

What is claimed and desired to be protected from United States letters patent is:

1. A system for land vehicles having at least one frame-mounted wheel in rotatable ground-contact and a driveshaft for driving said wheel, comprising:

means for selectively retarding rotation of said wheel at times when the vehicle is traveling down an incline, and for storing energy derived from said rotation including:

a coil spring having a first and a second end, and having at said first end means for disconnectable connection with the driveshaft and the frame for winding-up in response to rotation of said wheel, further having at said second end means for disconnectable connection with the driveshaft and the frame for releasing said stored energy for driving said wheel;

solenoid means for electro-mechanical connection in a first and a second position, said first position including connection of said first end of said spring to the vehicle frame, and said second end of said spring to the vehicle drive shaft for winding-up said spring in response to the motion of said wheel, and for connection in said second position in which the first end of the spring is connected with the drive shaft and the second end is connected with the frame for release of said stored energy for driving said wheel;

a switch means responsible to the incline of said vehicle frame resulting from vehicle ground contact for selecting both said first position and said second position of said solenoid means for causing storage of energy in said spring and for release of said energy stored in said spring.

2. A system as recited in claim 1, the switch means responsive to the incline of said vehicle resulting from ground contact being a mercury switch.

3. A system for land vehicles having a plurality of frame-mounted wheels in rotatable contact with the ground and a driveshaft for selectively driving a said wheel and being driven by said wheel, comprising: means for retarding rotation of said wheel and storing energy derived from said retarding, including a coil spring having means for selective connection with the driveshaft and with the frame for winding up in response to rotation of said wheel, and means for releasing said stored energy for driving said wheel, including means responsive to incline of the frame that may result from said ground contact of the plurality of frame-mounted wheels for selecting said selective connection, the coil spring further having first and second ends, the means responsive comprising: a mercury switch and first and second solenoids with responsive connection to said mercury switch for movement between a first position in which the first end of the coil spring is connected with the frame and the second end is connected with the driveshaft, and a second position in which the first end of the spring is connected with the driveshaft and the second end is connected with the frame.

* * * * *